Sept. 22, 1936.  R. H. NISBET  2,054,945
REMOTE CONTROL SYSTEM
Filed Oct. 25, 1933  2 Sheets-Sheet 1

INVENTOR
Robert H. Nisbet
BY Herbert H. Thompson
HIS ATTORNEY.

Sept. 22, 1936.   R. H. NISBET   2,054,945
REMOTE CONTROL SYSTEM
Filed Oct. 25, 1933   2 Sheets-Sheet 2
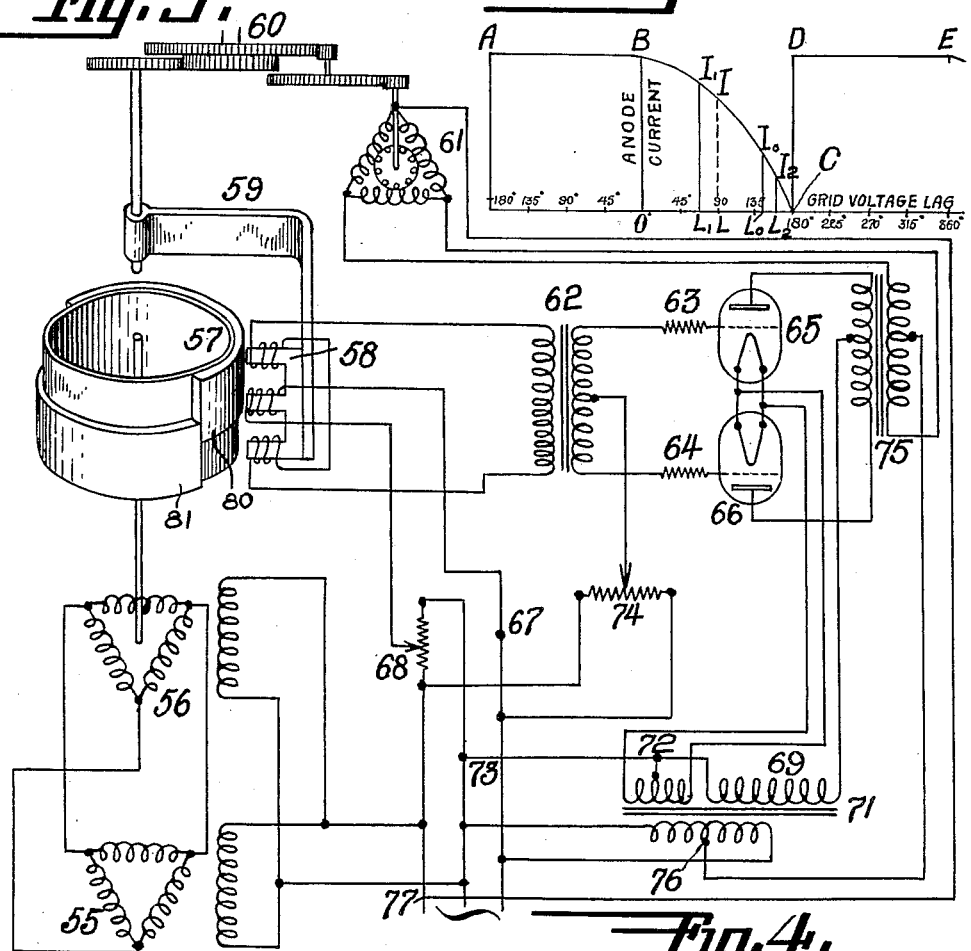
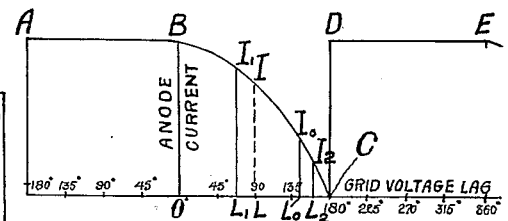
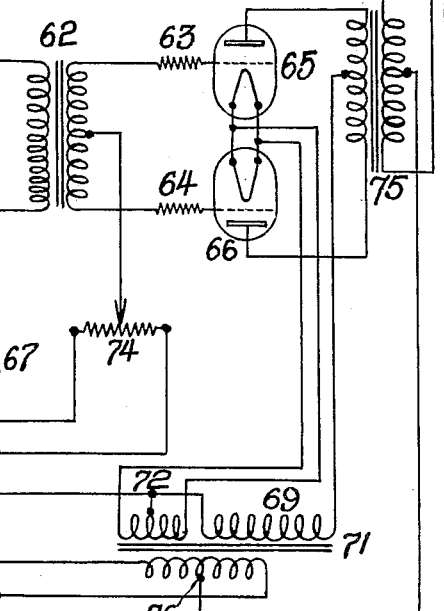
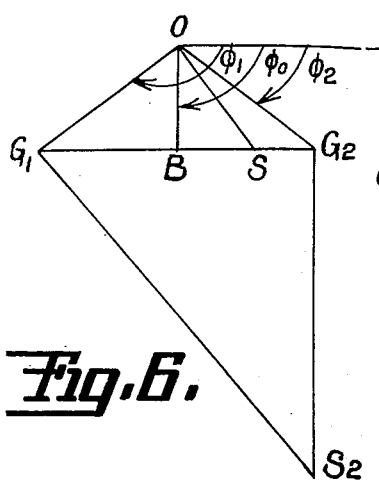
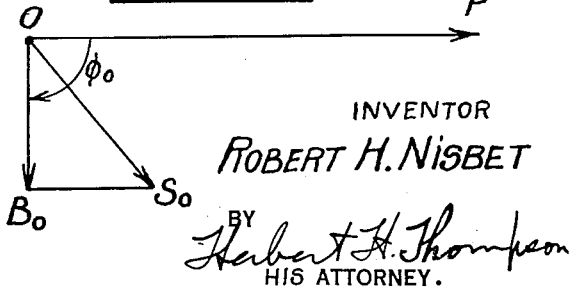
INVENTOR
ROBERT H. NISBET
BY Herbert H. Thompson
HIS ATTORNEY.

Patented Sept. 22, 1936

2,054,945

UNITED STATES PATENT OFFICE 2,054,945

REMOTE CONTROL SYSTEM

Robert H. Nisbet, Osterley, England, assignor to Sperry Gyroscope Company, Inc., Brooklyn, N. Y., a corporation of New York Application October 25, 1933, Serial No. 695,202
In Great Britain January 11, 1933

4 Claims. (Cl. 172—239)

This invention relates to improvements in the remote control of position of heavy objects, such as a searchlight or a gun, by the use of reversible electric motors. Such motors may be controlled by means of grid-glow or grid-controlled rectifier tubes by varing the current passed through the tubes so that the motor runs in the correct direction to drive the searchlight (or other object to be controlled) to the desired position. The control of current passed by such grid-controlled rectifier tubes is best achieved by applying alternating voltages to the tubes, by applying voltages of the same frequency to the grids, and by varying the phase of these grid voltages to secure control.

One object of the present invention is to provide means of obtaining voltages of variable phase to apply to the grids of grid-controlled rectifier tubes, and to provide means of adjusting the phase of these grid voltages to suitable operating values. Another object is to secure the graduated control of two or more grid-glow tubes so that as the current passed by one is increased, the current passed by the other is decreased.

A further object is to secure torque amplification so that positional torques applied to one rotary body may be used so as to produce amplified positional torques applied to the same or to another rotary body.

Referring to the drawings illustrating several forms my invention may assume;

Fig. 3 is a wiring diagram of a still further modification in which a standard type of self-synchronous transmission is used with an inductive power multiplying device at the receiver for controlling a polyphase motor.

Fig. 4 is a vector diagram illustrating how the phase is shifted on the grid of the grid glow tubes by my invention.

Figs. 5 and 6 are similar diagrams illustrating the method of phase shift in Fig. 2.

Fig. 7 is a diagram showing the effect of the phase shifts of the grid voltages on the output of the grid-glow tubes.

In my invention a transmitter is used at the transmitting end which transmits an electrical signal depending on the position of the sending element. At the receiving end is situated a device responsive to this electrical signal and to the position of the receiving element and adapted to provide an alternating voltage depending on the position of the sending and receiving elements. The output voltage of the receiving device changes in magnitude and polarity depending on the position of the transmitting element, or on the position of the receiving element or on both positions. The receiving device may, therefore, be termed a position controlled modulator and any device modulating an alternating voltage in accordance with the positions of the sending and receiving elements may be used in my invention.

The output of the position controlled modulator varies in magnitude and/or polarity. In my invention I combine this variable voltage, which I term the signal voltage, with another alternating voltage of different phase, which I term the phase bias voltage, and use the resulting voltage to control the grids of grid glow tubes which in turn control a reversible motor to position the object which it is desired to control. I may amplify the signal voltage before combining it with the phase bias voltage, and I may amplify the resultant voltage before applying it to control the grid-glow tubes. Phase adjustment may be provided on either the signal voltage or the phase bias voltage or on both.

Figure 1:
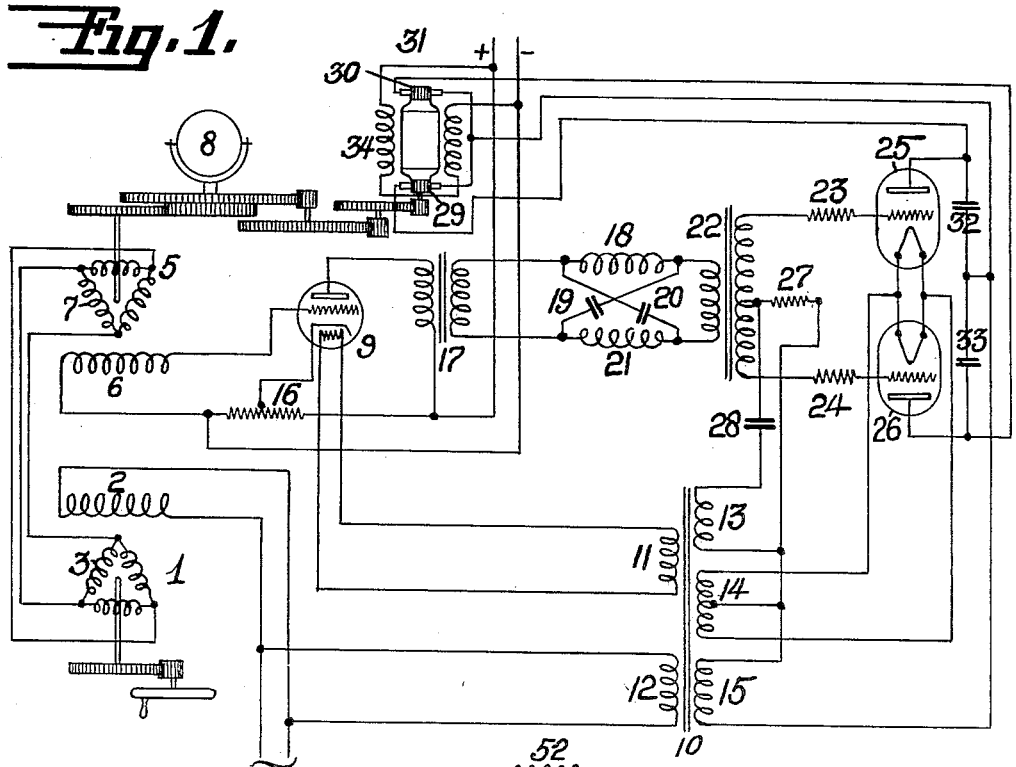
Fig. 1 is a wiring diagram of one form of my invention as applied to the remote control of a searchlight or other heavy object.

In Fig. 1, I is an alternating current inductive transmitter with its primary or field winding 2 energized from the supply mains. The three phase secondary winding 3 on the rotor of this transmitter is connected to the three phase secondary winding 7 on the rotor of an alternating current inductive receiver 5 similar in nature to the transmitter I. The receiver 5 provides an output voltage from its primary winding 6 which varies in magnitude according to the difference in the twists of the rotors of transmitter I and receiver 5 relative to their stators. This is the signal voltage.

The rotor of transmitter I is mechanically coupled to the sending element which may be a handwheel or other body whose position has to be reproduced at a distance. The rotor of receiver 5 is mechanically coupled to the following element which is shown as a searchlight 8.

In Fig. 1 the signal voltage is shown as amplified by the tube 9. This tube has its cathode heated by currents drawn from winding 11 of the supply transformer 10, whose primary winding 12 is connected to the supply mains. Grid bias and plate voltages are obtained from potentiometer 16 connected across D. C. supply mains. Tube 9 applies an amplified version of the signal to transformer 17 whose secondary winding is connected to the phase adjusting network 18, 19, 20, 21. The output of this network which is also an amplified version of the signal voltage but adjusted in phase to a suitable operating value is applied to the primary winding of transformer 22. The output of this transformer is applied in push-pull through current limiting resistors 23, 24 to the grids of the grid-glow tubes 25, 26. These tubes have their filaments heated by currents drawn from winding 14 on transformer 10.

Between the center point of this winding and the center point of the secondary winding of transformer 22 is connected an impedance shown as a resistance 27, across which is maintained an alternating voltage produced by currents drawn through impedance 28 (shown as a condenser) from winding 13 of transformer 10. Impedances 27, 28 act as a phase adjusting circuit so that the voltage maintained across 27 is shifted in phase from that of the voltage applied to the primary of transformer 10 and, therefore, from that of the voltage output of winding 15 of this transformer. One end of the latter winding is connected to the mid point of winding 14 supplying the cathodes of the grid-glow tubes and the other end is connected through armature winding 29 of the motor 31 to the anode of tube 25 and through armature winding 30 of the motor 31 to the anode of the grid glow tube 26. Across the armatures are connected condensers 32, 33. The field windings 34 of motor 31 are supplied from a D. C. source.

When the input control signal is zero, the grids of both tubes are at the same voltage as the center point of the secondary winding of transformer 22. The voltage maintained across resistance 27 is, therefore, the grid voltage of both tubes. An input signal voltage has, as will be shown, the effect of oppositely changing the phase of the grid voltages of the two tubes from their common initial value which is the phase of the voltage maintained across resistance 27. I term the voltage across 27 the phase bias voltage, since it determines the initial value of the phase of the grid voltages of the tubes.

Fig. 4 is a vector diagram illustrating a typical relationship between the voltages in the circuit. OP represents the voltage applied by winding 15 of transformer 10 to the circuit. This is the anode voltage on the tubes so long as no current is being passed. OB represents the phase bias voltage, which is shifted in phase from OP. $OG_1$ and $OG_2$ represent the grid voltages of the tubes 25 and 26 when an input signal voltage is applied to the circuit. $OG_1$ is obtained by adding to OB one half of the output voltage of transformer 22, and $OG_2$ is obtained by adding to OB an equal signal of opposite polarity. $G_1G_2$ is, therefore, bisected by B and represents the output voltage of transformer 22, i. e. the control signal after amplification and phase adjustment. The phase adjustment circuit 18, 19, 20, 21 ensures that the signal voltage $G_1G_2$ shall be out of phase with OB and be suitably related in phase to OB and OP to give satisfactory operating characteristics.

It is clear that the phase angles $\phi_1$, $\phi_2$ of the grid voltages of the two tubes are shifted from the initial value $\phi_0$ in opposite directions but not necessarily by equal amounts.

Fig. 7 is a diagram showing how the currents passed by the grid-glow tubes are affected by phase shifts of the kind illustrated in Fig. 4. The curve ABCDE is the characteristic showing anode current as a function of the phase of the grid voltage with respect to the anode voltage. $OL_0$, $OL_1$, $OL_2$ represent the phase angles of lag, $\phi_0$, $\phi_1$, $\phi_2$, of the grid voltage.

Referring to Fig. 1, if the handwheel operating the transmitter 1 is turned, the receiver 5 applies an input signal to the circuit whose polarity depends on the direction of rotation of 1. This input signal after amplification and phase shift is represented by $G_1G_2$ of Fig. 4 and shifts the phases of the grid voltages of tubes 25, 26 from the initial value $\phi_0$ to the values $\phi_1$ and $\phi_2$ respectively. The currents passed by the tubes change from the value $L_0I_0$ shown in Fig. 7 for both tubes to the values $L_1I_1$ in tube 25 and $L_2I_2$ in tube 26. Referring again to Fig. 1, the current in armature 29 now exceeds that in armature 30 by the amount $L_1I_1 - L_2I_2$ in Fig. 7 and the motor runs in one direction. This is arranged to be such that the rotor of receiver 5 moves in the direction to reduce the input signal to zero. When this occurs, the currents in armatures 29 and 30 become equal to $L_0I_0$ and the motor stops. The rotor of receiver 5 has, therefore, been driven through the same angle as that of transmitter 1 and the searchlight is positioned correctly.

Figure 2:
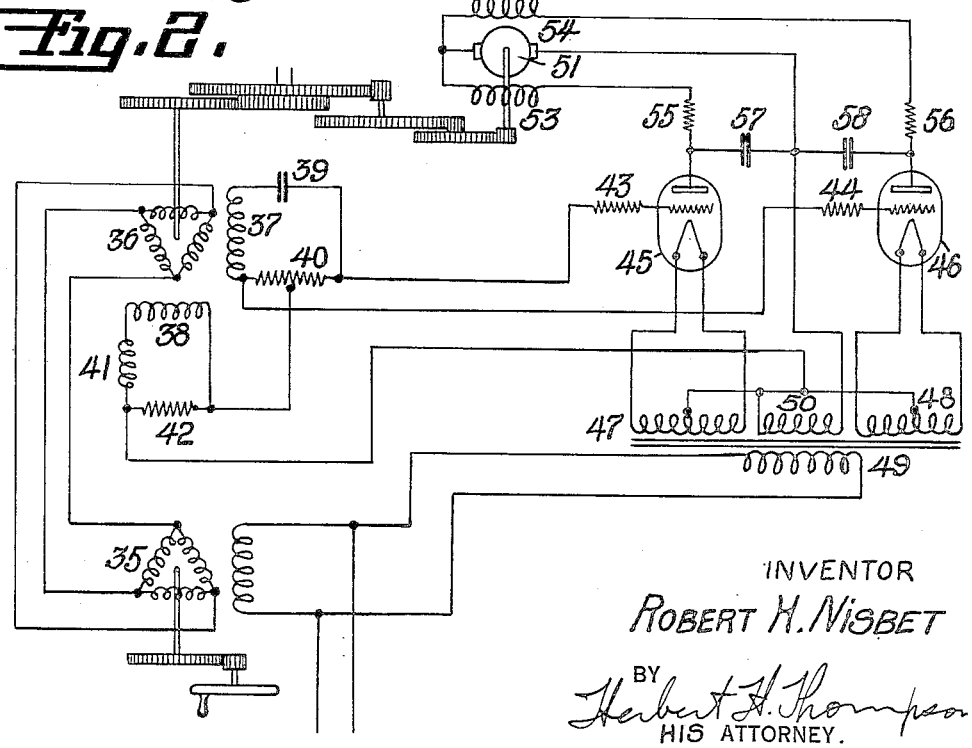
Fig. 2 is a wiring diagram of a modified form of my invention in which the phase bias is obtained from the same specially wound inductive receiver as the control signal.

In the absence of an input signal an idle current $L_0I_0$ in Fig. 7 flows through both armature windings of the positioning motor. This idle current can be kept small compared with the excess current $L_1I_1 - L_2I_2$ which determines the motor torque by using phase angles approximately as shown in Figs. 4 and 7. However, in the circuits of Figs. 2 and 3, where it is not important to keep down the idle current, the phase bias voltage OB of Fig. 4 would usually be arranged to lag approximately 90° on OP and the signal voltage $G_1G_2$ would be in phase with OP. The idle current in the anode circuits of the tubes would then be LI. In the circuit of Fig. 2, the current from both tubes flows through the armature of the motor so that the armature current is twice LI. The armature current does not change appreciably when an input signal is applied to the circuit. In Fig. 3 the idle current is kept out of the motor circuits.

Fig. 2 shows another method of carrying out the invention. Transmitting device 35 transmits to a receiving device 36 which has two field or primary windings 37, 38 in quadrature. The output voltages from these field windings are adjusted in phase to suitable values by the phase adjusting networks 39, 40, 41, 42 so that the voltage across impedance 40 differs in phase from the voltage output of 37 by a fixed amount, and the voltage across impedance 42 differs in phase from the output voltage of 38 by a fixed amount. The voltage across impedance 40 is applied through current limiting resistors 43, 44 to the grids of grid-glow tubes 45, 46. Between the midpoint of 40 and the midpoints of the cathode heater windings 47, 48 of transformer 49 is connected the voltage maintained across impedance 42. This latter voltage is, therefore, a phase bias voltage for the two tubes and in the absence of a signal from winding 36 of the selsyn applies the same voltage in the same phase to the two grids.

Figs. 5 and 6 are vector diagrams showing the phase relations in the circuit. Fig. 5 is the diagram for the case when the twists of the rotors of devices 35, 36 relative to their stators are such that the voltage output of winding 38 is a maximum, while that of winding 37 is zero. OP represents the anode voltage applied to the tubes. $OS_0$ represents the output of winding 38 and $OB_0$ represents the voltage maintained across 42 by this voltage.

Fig. 6 is a diagram for a case in which the relative position of the rotors of devices 35, 36 is different from the position for which Fig. 5 is drawn. The vector OS, representing the output of 38, is parallel to but smaller than $OS_0$, and the vector OB, representing the voltage across 42 maintained by OS, is smaller than $OB_0$. $G_1S_2$ parallel to OS represents the output of winding 37 and $G_1G_2$ the voltage across 40, which is maintained by $G_1S_2$ and which is shifted in phase and magnitude by the phase adjusting network 39, 40. Since OB is applied between the cathodes and the midpoint of 40, i. e. of $G_1G_2$, $OG_1$ and $OG_2$ represent the grid voltages applied to the tubes. The phases $\phi_1$, $\phi_2$ of these grid voltages are, therefore, changed in Fig. 6 from the initial value $\phi_0$ in Fig. 5 and the current passed by the tubes 45 and 46 is, therefore, varied. The constants of the circuit can be so chosen that the voltages $OG_1$, $OG_2$ are constant in magnitude and change only in phase.

The tubes 45 and 46 are supplied with alternating voltage from winding 50 of transformer 49 through the armature winding 51 and the field windings 52, 53, respectively, of motor 54. Limiting resistances 55, 56 may be used and condensers 57, 58 across the motor.

When there is an output from winding 37, the balance of currents in the motor windings 52, 53 is upset and the motor runs in the appropriate direction to reduce the output from 37 to zero. The motor comes to rest when the rotor of 36 reproduces the motion imparted to the rotor of 35. The motor 54 is shown as a series commutator motor but may be any form of reversible motor having separate windings on field or armature for each direction of rotation.

Fig. 3 is a diagram of another method of carrying out the invention. The receiving inductive device 56 is not mechanically coupled to the searchlight and has its field winding energized. It, therefore, repeats the position of the transmitting device 55. Mounted on the shaft of repeater 56 is the armature 57 of a control transformer which is supported on a mounting 59 mechanically coupled to the searchlight 60 and hence to the drive motor 61. The control transformer 58 and its armature 57 are so designed and shaped that the output from the transformer varies with the positions of the selsyn rotor 56 and of the searchlight 60. As illustrated, the armature 57 consists of a hollow cylindrical member of non-magnetic material, such as brass, having upper and lower or staggered segments 80 and 81 of magnetic material, such as soft iron, projecting from the outer surface thereof. Each of the segments 80 and 81 extends around a respective half of the circumference of the non-magnetic cylindrical member of armature 57. In Fig. 3 the control transformer is shown as having an E-shaped core with the primary winding on the center limb and with two secondary windings in opposition on the other limbs. Segment 80 of armature 57 is of such width as to substantially close the air gap between the center and upper limbs of transformer 58 when this segment is opposite the transformer, whereas segment 81 is of such width as to substantially close the air gap between the center and lower limbs of transformer 58 when this segment 81 is opposite transformer 58. The armature 57 varies the air gaps in the paths from the center limb to the outer limbs according to the position of 57 relative to 58, and, therefore, varies the magnitude of the output of transformer 58 according to whatever characteristic it is desired to give this output as a function of the positions of the selsyn 56 and the searchlight 60. In Fig. 3 the armature 57 is shown as shaped in the form suitable for reversing the output of transformer 58 when 57 and 58 are correctly aligned with respect to each other.

The output of the control transformer 58 is applied to transformer 62 whose secondary is connected through resistances 63, 64 to the grids of the grid glow tubes 65, 66. The primary winding of the control transformer 58 is supplied from tapping points 67, 68 on a three phase supply suitably chosen to give the control signal the correct phase relations with respect to the anode voltages on the tubes (i. e., preferably the bias voltage lags more than 90° with respect to the voltage on the grid, as previously pointed out).

The anode voltages of the tubes are obtained from winding 69 of transformer 71 whose primary winding 70 is supplied from one phase of the three phase supply. Winding 72 of the transformer supplies the filaments of the tubes. Between the center point 72 and the center point of the secondary winding of 62 is applied the phase bias voltage. This is obtained from tapping one wire 73 on the three phase supply and a mid point on resistance 74 connected across the other two wires and suitably chosen to give this phase bias voltage the correct phase relation.

As in the previous circuits described, the control signal depending on the positions of the receiver 56 and the searchlight 60 will cause one of the tubes 65, 66 to pass more current than the other. This current has an alternating component at supply frequency so that the transformer 75 whose primary winding is connected between the anodes of the tubes 65, 66 has an output at supply frequency. This output reverses in sign, or if preferred, in phase, according to which of the tubes 65, 66 passes more current. The output of 75 is applied to the exciting winding of a motor 61 of any type whose direction reverses with the polarity of the supply to the exciting winding. In Fig. 3 this is shown as a Scott-connected, three phase motor, the output of 75 being connected across one phase, while a quadrature voltage is supplied from suitable tapping points 76, 77 on the three phase supply. As in the previous circuits, the motor runs until the control signal is cut off thus bringing the searchlight into correct alignment with the selsyn 56.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a remote control system for positioning heavy receiving objects from a sending object, an A. C. supply, electrically coupled inductive devices powered from said supply at the sending and receiving objects, the output of the latter varying in magnitude and polarity with relative displacement of said devices, means for displacing the phase relation of said output, a power motor for driving said receiving object, a pair of grid glow tubes powered from said supply, the output currents of said grid glow tubes being supplied differentially to said power motor for driving the latter, means for deriving an out of phase voltage, and means for supplying the grids of said tubes with the combined out of phase voltage and the phase displaced output of the receiving inductive device.

2. In a remote control device for positioning heavy objects from a controlling object, a single phase supply, a self-synchronous transmitter powered from said supply, a receiving motor of the self-synchronous type having its multi-tapped winding connected to said transmitter and a pair of phase displaced secondaries, a grid-glow tube powered from said supply, means for combining the signals produced by said two secondaries to shift the phase on the grid of said tube with respect to its plate, and a power motor driven by the output of said tube.

3. In a remote control device for positioning heavy objects from a controlling object, a single phase supply, a self-synchronous transmitter powered from said supply, a receiving motor of the self-synchronous type having its multi-tapped winding connected to said transmitter and a pair of phase displaced secondaries, a pair of grid glow tubes powered from said supply, means for combining the signals produced by said two secondaries to shift oppositely the phase on the grids of said tubes with respect to their plates, and a reversible power motor driven by the output of said tubes.

4. In a remote control system for positioning receiving objects from a sending object, an A. C. supply, electrical inductive devices at the sending and receiving objects and powered from said A. C. supply, the output of said receiving inductive device varying in magnitude and polarity in accordance with the relative displacement of said objects, a pair of grid glow tubes powered from said A. C. supply, means for applying the output of said receiving inductive device in out of phase relation to the grids of said tubes, means for also supplying an out of phase voltage from said A. C. supply to the grids of said tubes, and a power motor for driving said receiving object, said power motor being connected differentially in the output circuits of said tubes.

ROBERT H. NISBET.